(12) United States Patent
Hiraoka

(10) Patent No.: US 8,676,278 B2
(45) Date of Patent: Mar. 18, 2014

(54) MOBILE TERMINAL DEVICE

(75) Inventor: Michiaki Hiraoka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 705 days.

(21) Appl. No.: 12/280,937

(22) PCT Filed: Feb. 21, 2007

(86) PCT No.: PCT/JP2007/053205
§ 371 (c)(1),
(2), (4) Date: Jun. 23, 2009

(87) PCT Pub. No.: WO2007/097369
PCT Pub. Date: Aug. 30, 2007

(65) Prior Publication Data
US 2009/0318195 A1    Dec. 24, 2009

(30) Foreign Application Priority Data

Feb. 27, 2006  (JP) .................................. 2006-050287

(51) Int. Cl.
*H04M 1/00*    (2006.01)
(52) U.S. Cl.
USPC ................... 455/575.3; 455/575.1; 455/575.4
(58) Field of Classification Search
USPC .................. 455/575.1–575.9, 344–350, 90.3, 455/550.1, 556.1, 556.2, 557; 16/312, 309; 345/169; 361/600, 625, 361/679.01–679.09, 679.1, 679.11–679.19, 361/679.2, 679.21–679.29, 679.3, 361/679.31–679.39, 679.4, 679.41–679.44
See application file for complete search history.

(56) References Cited

U.S. PATENT DOCUMENTS

| | | | |
|---|---|---|---|
| 6,529,742 B1 * | 3/2003 | Yang | 455/556.1 |
| 6,646,626 B1 * | 11/2003 | Uskali et al. | 345/87 |
| 6,728,557 B1 * | 4/2004 | Tracy et al. | 455/575.3 |
| 7,000,289 B2 * | 2/2006 | Cedrone | 16/309 |
| 7,483,723 B2 * | 1/2009 | Soderlund | 455/575.1 |
| 7,603,143 B2 * | 10/2009 | Kang et al. | 455/566 |
| 2004/0097262 A1 * | 5/2004 | Lee | 455/556.1 |

(Continued)

FOREIGN PATENT DOCUMENTS

| | | |
|---|---|---|
| JP | 2002009920 A | 1/2002 |
| JP | 2002101171 A | 4/2002 |

(Continued)

OTHER PUBLICATIONS

International Search Report for corresponding PCT application PCT/JP2007/053205 lists the references above.

*Primary Examiner* — San Htun
(74) *Attorney, Agent, or Firm* — DLA Piper LLP (US)

(57) ABSTRACT

A mobile terminal device comprise a first housing 11a provided with a displaying unit 13; a second housing 11b on which the first housing 11a is laid; a hinge portion 12 pivotably connecting respective one end portions of the first housing 11a and second housing 11b with each other such that the first housing 11a moves toward/away from the second housing 11b; and a self-stand maintaining unit for maintaining a self-standing state where the displaying unit 13 is inclined by pivoting the first housing 11a relative to the second housing 11b with the hinge portion 12 as a pivoting center, as well as moving the first housing 11a along an axial direction of the hinge 12 to bring a side of the first housing 11a and a contact portion A on a side surface of the second housing 11b into contact with a placement surface.

9 Claims, 12 Drawing Sheets

(56) References Cited

U.S. PATENT DOCUMENTS

2004/0203526 A1* 10/2004 Romeu et al. ............... 455/90.3
2005/0102798 A1* 5/2005 Kato .............................. 16/366
2005/0192066 A1* 9/2005 Park et al. .................. 455/575.3
2006/0034042 A1* 2/2006 Hisano et al. ................ 361/681
2006/0264243 A1* 11/2006 Aarras ......................... 455/566

FOREIGN PATENT DOCUMENTS

| JP | 2003008720 A | 1/2003 |
| JP | 2006019925 A | 1/2006 |
| JP | 2006135830 A | 5/2006 |

* cited by examiner (a)

(b)

(a)

(b)

MOBILE TERMINAL DEVICE

CROSS-REFERENCE TO RELATED APPLICATIONS

This application is a national stage of International Application No. PCT/JP2007/053205 filed Feb. 21, 2007, which also claims the benefit of priority under 35 USC 119 to Japanese Patent Application No. 2006-050287, filed Feb. 27, 2006 the entire contents of which are incorporated herein by reference.

TECHNICAL FIELD

The present invention relates to a mobile terminal device and, in particular, to a mobile terminal device equipped with a TV (Television) function.

RELATED ART

There is conventionally known a mobile terminal device in which two housings overlapping one on the other are pivotably connected each other so that they can move toward/away from each other. Recently a mobile phone with a TV function which is composed by equipping such a conventional mobile terminal device with a TV broadcast receiving function has become popular.

Meanwhile, when the mobile phone with a TV function is used to watch a TV program, it is desirably viewed on a landscape screen where its displaying unit is arranged transversally. Therefore, in order to keep the mobile phone with a TV function in a self-standing state where the display unit is arranged in a landscape position or in an upwardly inclined state, there is generally a method of using a dedicated member for securing a self-standing posture such as a charging mount or a stand.

As such conventional mobile terminal device using a charging mount, a stand and the like, there are known "PORTABLE COMMUNICATION DEVICE" (Japanese Patent Application Laid-Open No. 2003-008720) and "PORTABLE DEVICE TO BE SET WITH POWER SUPPLY DEVICE AND SUCH POWER SUPPLY DEVICE" (Japanese Patent Application Laid-Open No. 2002-009920). In the "PORTABLE COMMUNICATION DEVICE" reference, grooves extending in parallel in a thickness direction at a predetermined angle are provided on both side faces of a body housing of a thin mobile communication device, and a generally concaved stand which is a piece move away from the housing and has stand legs longer than the thickness of the housing extending in parallel in the same direction on both ends of a connecting portion having a substantially the same length as the width of the housing is provided such that both of the stand legs are fitted into both of the grooves to fix the stands to the housing.

In the "PORTABLE DEVICE TO BE SET WITH POWER SUPPLYING DEVICE AND POWER SUPPLYING DEVICE" reference, a portable device forms a set with a power supplying device and is characterized in that the device comprises a power supplying device provided with a body unit in which a power supplying circuit is embedded as well as a connector unit to which a power supplying terminal is attached; a stand component mounted to the connector unit to facilitate the connector unit to inversely stand, and a portable device adopted to be attached with the connector unit for charging an embedded secondary battery.

DISCLOSURE OF THE INVENTION

Problems to be Solved by the Invention

However, during outing and the like with a mobile phone being used, a charging mount is usually not carried with the mobile phone. Further, it is bothersome to always carry a charging mount, a stand or the like in housing of being used for keeping the mobile phone with a TV function in a self-standing state where the display unit is arranged in a landscape position or in an upwardly inclined state, which goes against a trend toward promoting a reduction in size and weight of the mobile phone. It is an object of the present invention to provide a mobile terminal device capable of maintaining a self-standing state where a display surface is inclined without using any dedicated member but with the mobile phone alone.

Means for Solving the Problems

In order to solve the above-described object a mobile terminal device according to the present invention includes a first housing provided with a displaying unit; a second housing on which the first housing is laid; a hinge portion pivotably connecting respective one end portions of the first and second housings with each other such that the first housing moves toward/away from the second housing; and a self-stand maintaining unit for maintaining a self-standing state where the displaying unit is inclined by pivoting the first housing relative to the second housing with the hinge as a pivoting center, as well as moving the first housing along an axial direction of the hinge to bring a side of the first housing and a contact portion on a side surface of the second housing into contact with a placement surface.

Effect of the Invention

According to the present invention, in the mobile terminal device, the first housing provided with the displaying unit is laid on the second housing, the hinge portion pivotably connects respective one end portions of the first and second housings with each other such that the first housing moves toward/away from the second housing, and the first housing is pivoted about the hinge portion at a predetermined angle (e.g., 270 degrees) and locked (maintained) in a state where the first housing is displaced along the axial direction of the hinge portion, whereby the side of the first housing and the contact portion on the side surface of the second housing are brought into contact with the placement surface to maintain the self-standing state in which the displaying unit is inclined. This allows the mobile terminal device in itself to be maintained in the self-standing state where the display surface is inclined without using any dedicate member.

Figure 1:
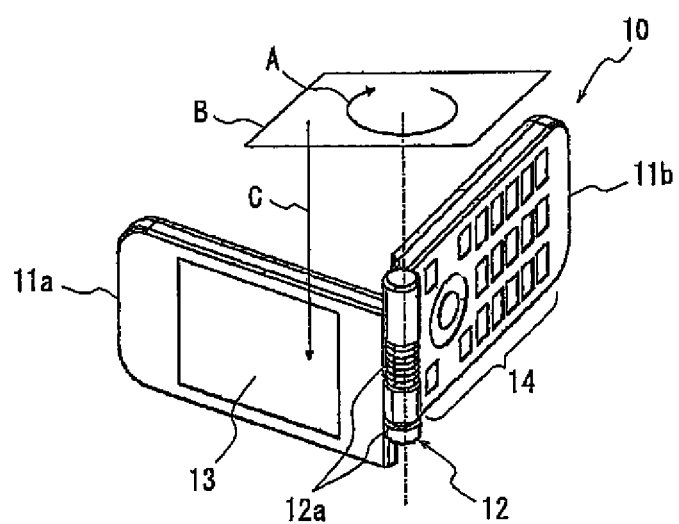
FIG. 1 is a perspective view showing an appearance of a mobile phone according to a first embodiment of the present invention.

REFERENCE SYMBOLS 10, 40, 50 Mobile phone
11a, 42a, 46, 51 First housing
11b, 42b, Second housing
12, 41 Hinge portion
12a Cover
13, 52 Displaying unit
14 Key operating unit
15, 44, 47 First-housing-side pin receiving portion
15a Hole
16 Inner-circumferential-surface key groove
17 Outer-circumferential-surface key groove
17a Bottom Surface
18a, 18b Second-housing-side pin receiving portion
19, 23 Protrusion
19a Recessed portion
20 Locking member
21 Biasing means
22 Rotary shaft portion
22a First part
22b Second part
24 Wireless unit
25 Memory unit
26 Key operating unit
27 Tuner unit
28 Demodulating unit
29 Branching unit
30 Audio processing unit
31 Video processing unit
32 Data processing unit
33 Speaker
34 Pivot detecting unit
35 Controlling unit
36, 37 Antenna unit
43, 48 Cam groove
43a, 48a First cam groove
43b, 48b Second cam groove
45 Projection
48c Third cam groove
A Pivot direction
B Pivot plane
D Desk
L Ridgeline
P Contact portion
a Movement amount
b Inclination angle

BEST MODE FOR CARRYING OUT THE INVENTION

Hereinafter, the best embodiments for carrying out the present invention will be described with reference to the attached drawings.

(First Embodiment)

FIG. 1 is a perspective view showing an appearance of a mobile phone according to a first embodiment of the present invention. As shown in FIG. 1, a mobile phone 10, which is a mobile terminal device, is the mobile phone with TV (Television) which has pivotably assembled two housings 11a, 11b and is equipped with a TV broadcast receiving function.

The first housing 11a and the second housing 11b are respectively formed in generally identical planar shape, and one end portions of each housing, which are mutually adjacent when the both housings 11a, 11b are continuously arranged lengthwise, are connected with each other by a hinge portion 12. Accordingly, the first housing 11a provided with a displaying unit (displaying panel) 13 can pivot by means of the binge portion 12 so as to relatively move toward/away from the second housing 11b provided on its surface with another necessary unit such as a key operating unit 14.

In other words, as a result of a pivot motion in which the first and second housings 11a, 11b relatively move away from each other, a posture of the mobile phone 10 can be altered from a closed state (not shown) with a pivot angle of 0 degree which is a housing-retracted state where the housings 11a, 11b are overlapped with each other, to an opened state (see FIG. 1) having a release angle of 270 degrees defined by the housings 11a, 11b which is a housing-released state where the housings 11a, 11b are opened. Moreover, when the release angle is approximately 270 degrees, the first housing 11a moves relative to the second housing 11b toward a direction C generally perpendicular to a pivot plane B formed by a pivot direction A with the hinge portion 12 as a pivoting center, and the housing 11a is displaced to laterally misalign with the housing 11b. At this time, the first housing 11a is locked and maintained in the misaligned state.

Figure 2:
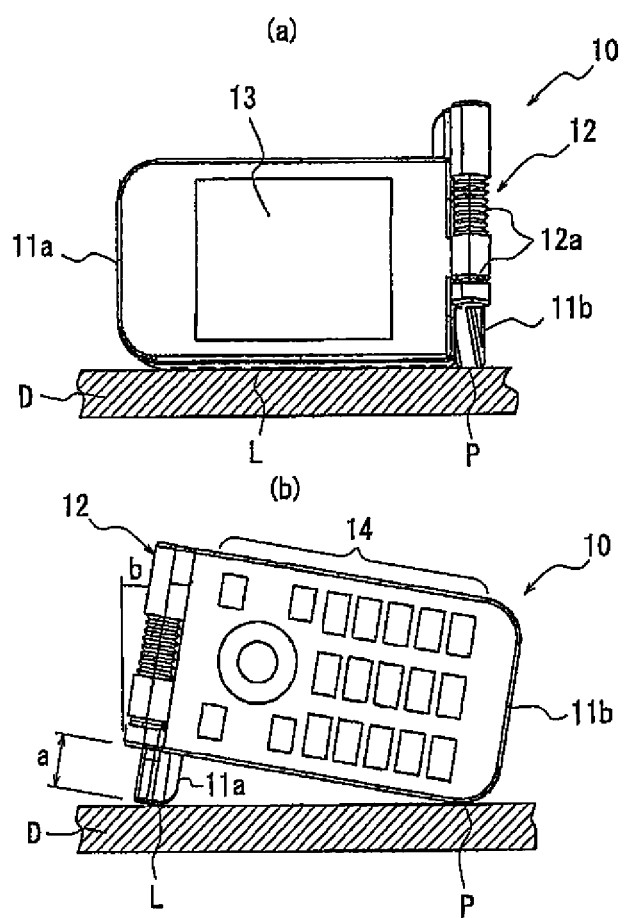
FIG. 2 shows a self-standing state of the mobile phone, in which (a) is an explanatory view as viewed from a displaying unit side and (b) is an explanatory view as viewed from a key operating unit side.

The hinge portion 12 is attached with a cover 12a, however, the cover 12a is formed in a telescopic bellow-shape, so that the displacement of the first housing 11a is not inhibited in the pivot direction A and the direction C. FIG. 2 shows a self-standing state of the mobile phone, in which (a) is an explanatory view as viewed from the displaying unit side and (b) is an explanatory view as viewed from the key operating unit side. As shown in FIG. 2, when the release angle is approximately 270 degrees, the mobile phone 10 can be maintained in the self-standing state by being placed on a placement location such as a desk D in a lay-down state where both of the housings 11a and 11b are laid down.

In this state, the mobile phone 10 contacts with the desk D at points of a ridgeline L on a side surface on the desk D side of the first housing 11a and of a contact portion P on a side surface end on the desk D side of the second housing 11b (refer to (a), (b)), so that depending on the amount of displacement of the first housing 11a in the direction C (refer to (b)), an inclination angle of the displaying unit 13 in the self-stand state of the mobile phone 10 is determined. In this embodiment, when the first housing 11a has the generally same size as that of the second housing 11b, and the mobile phone 10 whose housings are retracted has a longitudinal dimension (i.e., the longitudinal dimension of the respective housings) of approximately 100 mm, a width dimension of approximately 50 mm and an amount of displacement (an amount of offset of the central axis) of the first housing 11a with respect to the second housing 11b of approximately 13 mm at a position where the release angle α of approximately 270 degrees, the displaying unit 13 which is an image display screen can have an inclination angle b of approximately 10 degrees.

In other words, the mobile phone 10 is maintained in the self-standing state with the displaying unit 13 inclined at the inclination angle b of approximately 10 degrees while facing upwardly in the housing-released state in which the release angle α is approximately 270 degrees (refer to FIG. 2). This allows the mobile phone 10 to be maintained in the self-standing state where the displaying unit 13 is inclined only by itself without using any dedicate member.

Figure 3:
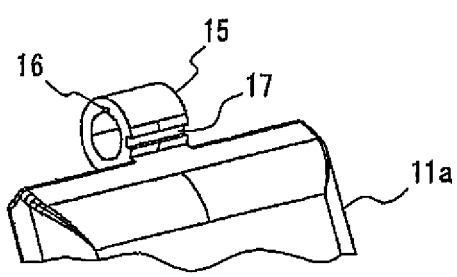
FIG. 3 shows a disassembled configuration of the mobile phone shown in FIG. 1, in which (a) and (b) are perspective views on the first housing side and on the second housing side, respectively.
Figure 3:
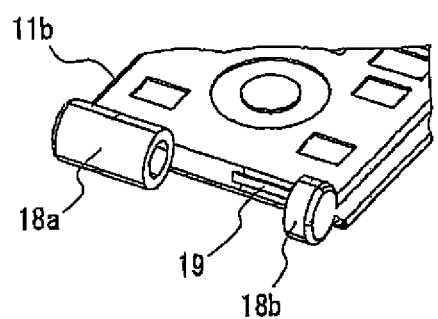

FIG. 3 shows a disassembled constitution of the hinge portion of the mobile phone as shown in FIG. 1, in which FIGS. 3 (a) and 3 (b) are perspective views on the first housing side and on the second housing side, respectively. As shown in FIG. 3, the first housing 11a has a first-housing-side pin-receiving portion 15 having a cylindrical shape along a direction of an end side of the housing generally at a center of the end side of the housing. The first-housing-side pin receiving portion 15 is provided on its inner circumferential surface and outer circumferential surface with an inner-circumferential-surface key groove 16 and an outer-circumferential-surface key groove 17, respectively, both of the grooves being positioned along the longitudinal direction of the cylinder as well as having an angle of generally 90 degrees with its cylindrical axis as a center (refer to FIG. 3 (a).). The second housing 11b has second-housing-side pin receiving portions 18a, 18b at both ends of its end side, each of which having a bottomed cylindrical shape along the direction of the end side of the housing. At the second-housing-side pin receiving portion 18b side between the second-housing-side pin receiving portions 18a and 15b, there is provided a protrusion 19 along the direction of the end side of the housing (refer to FIG. 3 (b)).

Figure 4:
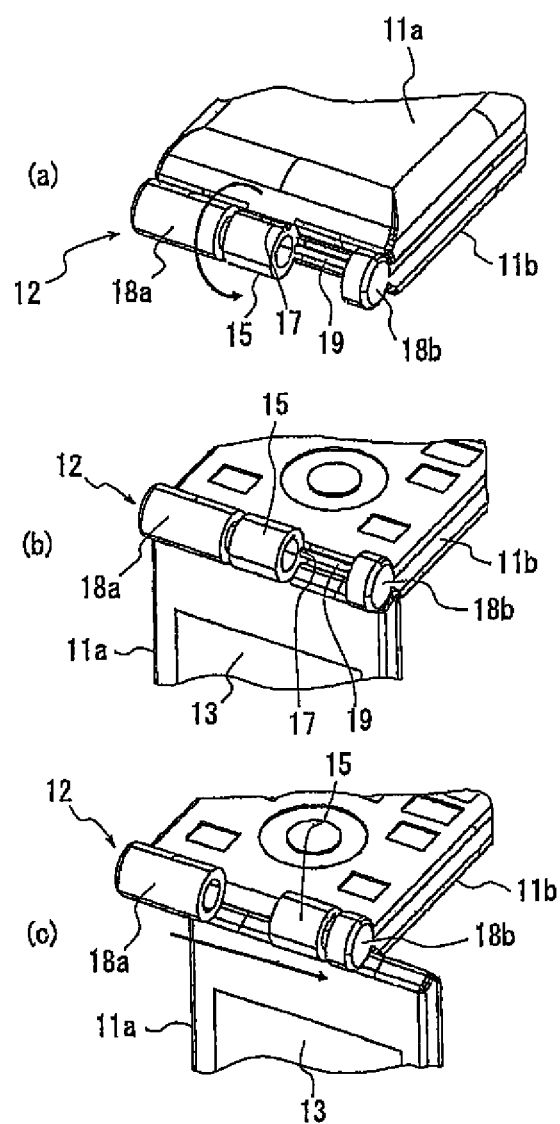
FIG. 4 shows combinations of each component in FIG. 3, in which (a) is a perspective view of a state where the housings are retracted, (b) is a perspective view of a state where the housings are released, and (c) is a perspective view of a state where the first housing is displaced.

The first-housing-side pin receiving portion 15 and the second-housing-side pin receiving portions 18a, 18b have the generally same inner diameter and appearance shape, and the protrusion 19 is formed in such a shape that the outer-circumferential-surface key groove 17 can be slidably attached along the protrusion 19. FIG. 4 shows combinations of each component in FIG. 3, in which (a) is a perspective view of a state where the housings are retracted, (b) is a perspective view of a state where the first housing is released, and (c) is a perspective view of a state where the first housing is displaced. As shown in FIG. 4, in the housing-retracted state, the first housing 11a and the second housing 11b are laid one on the other and are in the closed state with the pivot angle of zero degree. In this state, the first-housing-side pin receiving portion 15 is located at a position between the second-housing-side pin receiving portions 18a and 18b where the portion 15 is not engaged with the protrusion 19, and the outer-circumferential-surface key groove 17 is positioned above the protrusion 19 while having the angle of generally 90 degrees with its cylindrical axis as the center (refer to FIG. 4 (a)).

From this housing-retracted state, the first housing 11a pivots about the hinge 12 in a direction to move away from the second housing 11b (refer to an arrow in FIG. 4 (a)) by approximately 270 degrees, and the housing-released state is achieved. In the housing-released state, the first housing 11a and the second housing 11b are in the opened state with the release angle, which is defined by the housings 11a and 11b, of approximately 270 degrees. In this state, the first-housing-side pin receiving portion 15 is located at the position between the second-housing-side pin receiving portions 18a and 18b where the portion 15 is not engaged with the protrusion 19, however, the outer-circumferential-surface key groove 17 is positioned in an extension direction of the protrusion 19 (refer to FIG. 4 (b)).

In other words, only when the release angle defined by the housings 11a and 11b is approximately 270 degrees, the position of the outer-circumferential-surface key groove 17 coincides with that of the protrusion 19, thereby allowing the outer-circumferential-surface key groove 17 to be slidably engaged along the protrusion 19. Accordingly, when the release angle defined by the housings 11a and 11b is approximately 270 degrees (refer to FIG. 4 (b)), the first housing 11a can move toward the second housing 11b while guided by the protrusion 19 (refer to FIG. 4 (c)). Then, the first-housing-side pin receiving portion 15 having moved while guided by the protrusion 19 is located in the vicinity of the second-housing-side pin receiving portion 18b, which leads to a state where the first housing 11a is shifted toward the second-housing-side pin receiving portion 18b side with respect to the second housing 11b (refer to FIG. 4 (c)).

Figure 5:
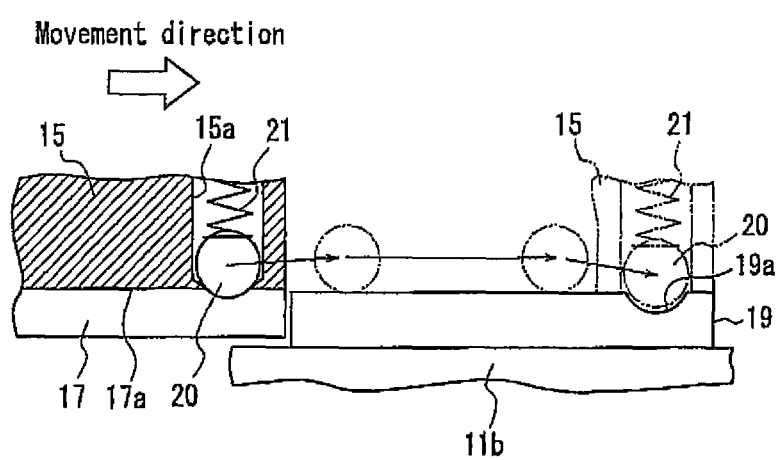
FIG. 5 is an explanatory view showing a state in which the first housing is in a locked and maintained state while the mobile phone as shown in FIG. 1 is in the self-standing state.

When the release angle defined by the housings 11a and 11b is within a range of 0 to approximately 270 degrees, such as when the release angle is approximately 180 degrees suitable for use of the mobile phone for calling and the like, the protrusion 19 abuts against an end surface of the first-housing-side pin receiving portion 15 to serve as a stopper for restricting movement of the first housing 11a, so that a normal release operation of the housing can be performed in the pivot direction A within the pivot plane B (refer to FIG. 1). FIG. 5 is an explanatory view showing a state in which the first housing is in a locked and maintained state while the mobile phone as shown in FIG. 1 is in the self-standing state. As shown in FIG. 5, in the self-stand state of the mobile phone 10, a locking member 20 protruding onto the outer-circumferential-surface key groove 17 is locked in a recessed portion 19a, so that the first-housing-side pin receiving portion 15 of the first housing 11a is fixed in a state that it covers the protrusion 19.

The locking member 20 is formed, for example, in a spherical shape, and is attached to a hole 15a bored in the first-housing-side pin receiving portion 15 so as not to be dropped off, The member 20 is also urged and maintained in a state where it slightly protrudes from a bottom surface 17a of the outer-circumferential-surface key groove 17 by, for example, an urging means 21 such as a compressive spring. The recessed portion 19a is formed on an upper surface of the protrusion 19, with which the bottom surface 17a of the outer-circumferential-surface key groove 17 contacts when the key groove 17 slides while guided by the protrusion 19, as well as in a round hole-shape into which the locking member 20 is inserted and locked.

When the release angle defined by the housings 11a and 11b is approximately 270 degrees, the first-housing-side pin receiving portion 15 is positioned on an extension line of the protrusion 19, and the locking member 20 slightly protrudes from the bottom surface 17a. Then, as the first housing 11a moves in the direction C, the first-housing-side pin receiving portion 15 moves along the protrusion 19 while guided by the protrusion 19. At this time, the locking member 20 is in pressure-contact with the upper surface of the protrusion 19. When the first-housing-side pin receiving portion 15 is located in the vicinity of the second-housing-side pin receiving portion 18b and the first housing 11a is shifted to the pin receiving portion 18b side (refer to FIG. 4 (c)), the locking member 20 reaches the recessed portion 19a to be inserted in the portion 19a by the action of urging force of the urging means 21, and is maintained in this state. The locking member 20 is maintained in a locking state in which the member 20 is inserted in the recessed portion 19a, thereby suppressing the first housing 11a from subsequently moving.

This makes the mobile phone 10 fixedly maintained at the position where the release angle α defined by the housings 11a, 11b is approximately 270 degrees while the first housing 11a is laterally shifted (refer to FIG. 2) with the amount of displacement a (the amount of offset of the central axis) of the first housing 11a with respect to the second housing 11b of approximately 13 mm. Accordingly, the locking member 20 attached to the hole 15a in the first-housing-side pin receiving portion 15, the urging means 21 for compressively urging the member 20, and the recessed portion 19a in the locking protrusion 19, at which the member 20 is locked, function as a fixedly-maintaining means for fixedly maintaining the first housing 11a in the position where the housing 11a laterally displaced (refer to FIG. 2). It is noted that in addition to that the locking member 20 and the recessed portion 19a are provided to the first-housing-side pin receiving portion 15 and the protrusion 19, respectively as described above, the locking member 20 and the portion 19a may be provided on the protrusion 19 and the portion 15, respectively.

Figure 6:
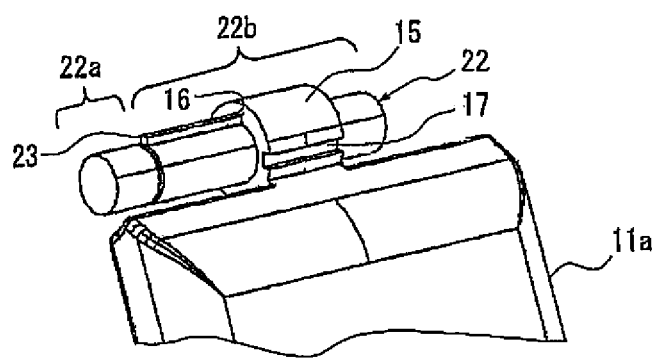
FIG. 6 is a perspective view of a state where a uniaxial hinge is attached to the hinge portion of the mobile phone as shown in FIG. 1.

FIG. 6 is a perspective view of a state where a uniaxial hinge is attached to the hinge portion of the mobile phone in FIG. 1. As shown in FIG. 6, the hinge 12 (refer to FIG. 1) of the mobile phone 10 can be realized by using a uniaxial hinge structure that is a general hinge structure. A rotary shaft portion (pin portion) 22 passes through and is fixed to both of the first-housing-side pin receiving portion 15 and the second-housing-side pin receiving portions 18a, 18b (refer to FIG. 4), and the rotary shaft portion has a first part 22a which is to be attached to the second-housing-side pin receiving portion 18b (refer to FIG. 4) and which is formed at a boundary part with a second part 22b except for the first part 22a such that it can pivot around an axis of the portion 22. The longitudinal length of the second part 22b is adopted such that the amount of the movement of the first-housing-side pin receiving portion 15, which corresponds to the amount of the movement of the first housing 11a, falls in a movable range of the first-housing-side pin receiving portion 15 at the second part 22b to which the first-housing-side pin receiving portion 15 is attached.

On an outer circumferential surface of the second part 22b a protrusion 23 attachable to the inner-circumferential-surface key groove 16 provided to the first-housing-side pin receiving portion 15 is formed along the longitudinal direction of the part 22b. By attaching this protrusion 21 to the inner-circumferential-surface key groove 16 and inserting the second part 22b into the first-housing-side pin receiving portion 15, the first housing 11a interlocks with the pivot motion of the region 22b. Then, the first part 22a is inserted in the second-housing-side pin receiving portion 18b and the second part 22b is inserted in the second-housing-side pin receiving portion 18a with the protrusion 23 attached to the inner-circumferential-surface key groove 16 as well as passing through the first-housing-side pin receiving portion 15, whereby the rotary shaft portion 22 is attached to the portion 15 and the portions 18a, 18b. This allows the first housing 11a to freely pivot in the pivot direction A relative to the second housing 11b and to freely move while being laterally displaced along the direction C, via the rotary shaft portion 22.

Figure 7:
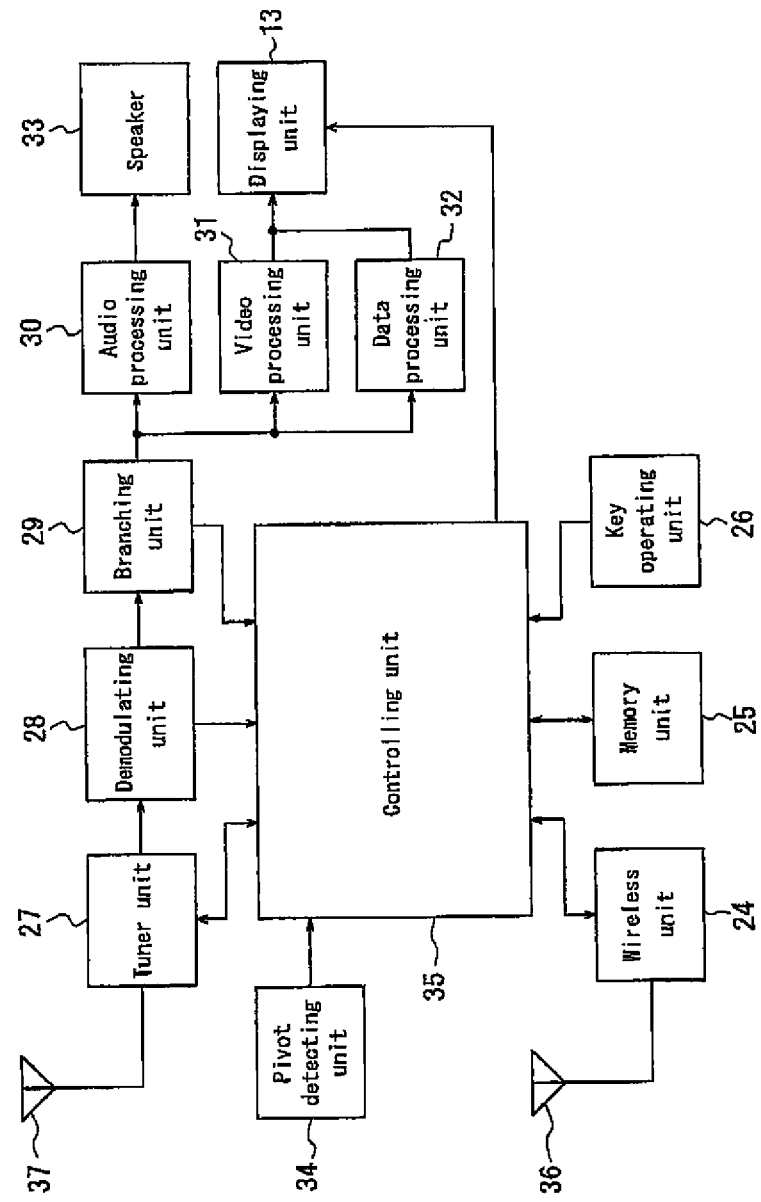
FIG. 7 is a block diagram showing a constitution of the mobile phone shown in FIG. 1.

A thin-wire coaxial cable (not shown) having a flexible structure through within the hinge portion 12 can electrically connect the first housing 11a with the second housing 11b both being coupled with each other by the hinge portion 12 and allowing the pivot in the pivot direction A as well as the movement in the longitudinal direction of the hinge portion 12. FIG. 7 is a block diagram showing a constitution of the mobile phone shown in FIG. 1. As shown in FIG. 7, the mobile phone 10 includes a wireless unit 24, a memory unit 25, a key operating unit 26, a tuner unit 27, a demodulating unit 28, a branching unit 29, an audio processing unit 30, a video processing unit 31, a data processing unit 32, a speaker 33, the displaying unit 13, a pivot detecting unit 34, and a controlling unit 35. An antenna unit 36 is connected to the wireless unit 24. An antenna unit 37 for TV broadcast wave is connected to the tuner unit 27.

The wireless unit 24 performs wireless communication processing with respect to calling information that is input and output via the antenna unit 36. The memory unit 25 stores the information. The key operating unit 26 outputs information on key operation. The tuner unit 27 receives a TV broadcast signal that is input via the antenna unit 37. The demodulating unit 28 takes out a transport stream (TS) packet. The branching unit 29 demultiplexes the taken-out TS packet. The audio processing unit 30, the video processing unit 31, and the data processing unit 32 perform audio processing as well as video processing of the demultiplexed TS packet. Audio processing information is vocally output by the speaker 33. Video processing information is visually output on the displaying unit 13.

The pivot detecting unit 34 detects the release angle of the housing, which is the pivot angle of the first housing 11a relative to the second housing 11b. The controlling unit 35 controls various processing in the mobile phone 10. When the pivot detecting unit 34 detects that the release angle of the housing reaches 180 degrees, the controlling unit 35 performs various processing upon receiving the TV broadcast signal, such as activation of the tuner 27 or view-angle control for widening a view angle of the displaying unit 13.

(Second Embodiment)

Figure 8:
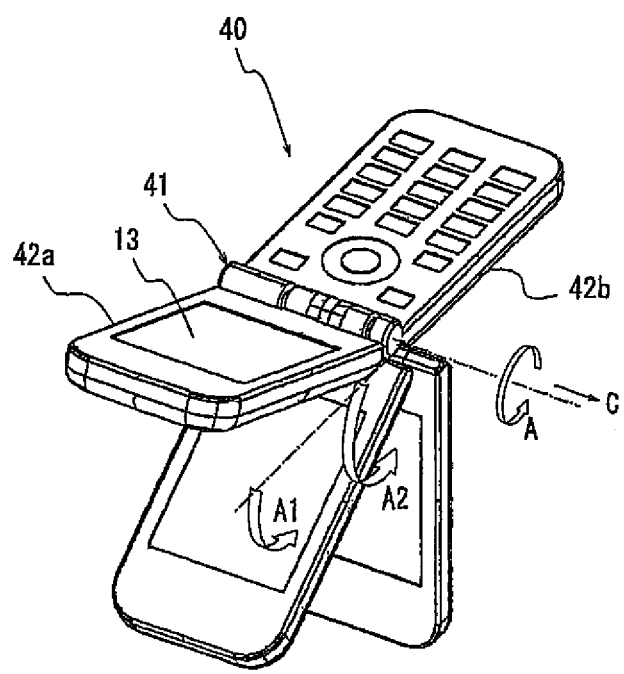
FIG. 8 is an explanatory view showing another example in which housings of a mobile phone according to a second embodiment of the present invention are released.

FIG. 8 is an explanatory view showing another example in which a housing of a mobile phone is released according to a second embodiment of the present invention. As shown in FIG. 8, a mobile phone 40 includes a first housing 42a and a second housing 42b both coupled with each other by a hinge portion 41 in place of the hinge portion 12, and, depending on the release angle of the housing 42a with respect to the housing 42b, the amount of the movement of the housing 42a in the direction C continuously varies. Other constitution and operation are same as those described with reference to the mobile phone 10 according to the first embodiment (refer to FIG. 1).

In other words, the first housing 42a may stop pivoting in the pivot direction A at a certain release angle by means of a locking mechanism (not shown), and from this state, may move in the direction C as shown in the first embodiment, however, the housing 42a may gradually start to move in the direction C, for example, from a point of time A1 where the release angle exceeds 180 degrees, and the housing 42a may move such that the amount of movement is maximum at a point of time A2 where the release angle reaches 270 degrees.

Figure 9:
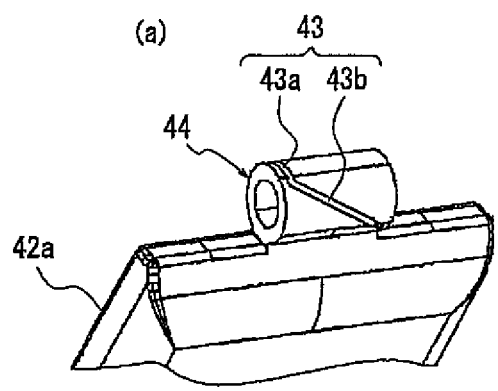
FIG. 9 shows a constitutional example of a hinge portion of the mobile phone shown in FIG. 8, in which (a) is an explanatory view of a cam groove formed on the first housing and (b) is an explanatory view of a projection formed on the second housing.
Figure 9:
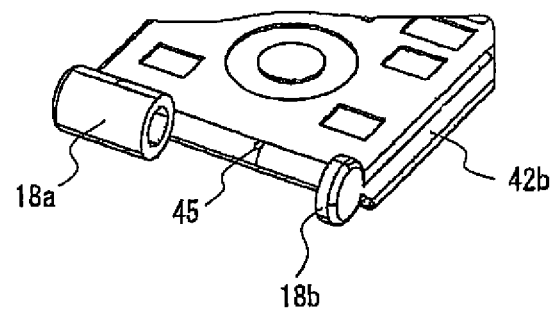

FIG. 9 shows a constitutional example of the hinge portion of the mobile phone shown in FIG. 8, in which (a) is an explanatory view of a cam groove formed on the first housing and (b) is an explanatory view of a projection formed on the second housing. As shown in FIG. 9, the hinge portion 41 (refer to FIG. 8) has a first-housing-side pin receiving portion 44 provided with a cam groove 43 at the first housing 42a, and provides a projection 45 on the second housing 42b. Other constitution and operation are same as those described with reference to the hinge portion 12 (refer to FIG. 1) in the mobile phone 10. The cam groove 43 is made up of a first cam groove 43a that guides the movement of the first housing 42a in the pivot direction A (refer to FIG. 1) at the pivot angle within a range of 0 to 180 degrees and is disposed in parallel with the direction A, as well as a second cam grove 43b that guides the movement of the first housing 42a in the pivot direction A at the pivot angle within a range of 180 to 270 degrees and is disposed obliquely relative to the direction A (refer to (a) in FIG. 9).

Figure 10:
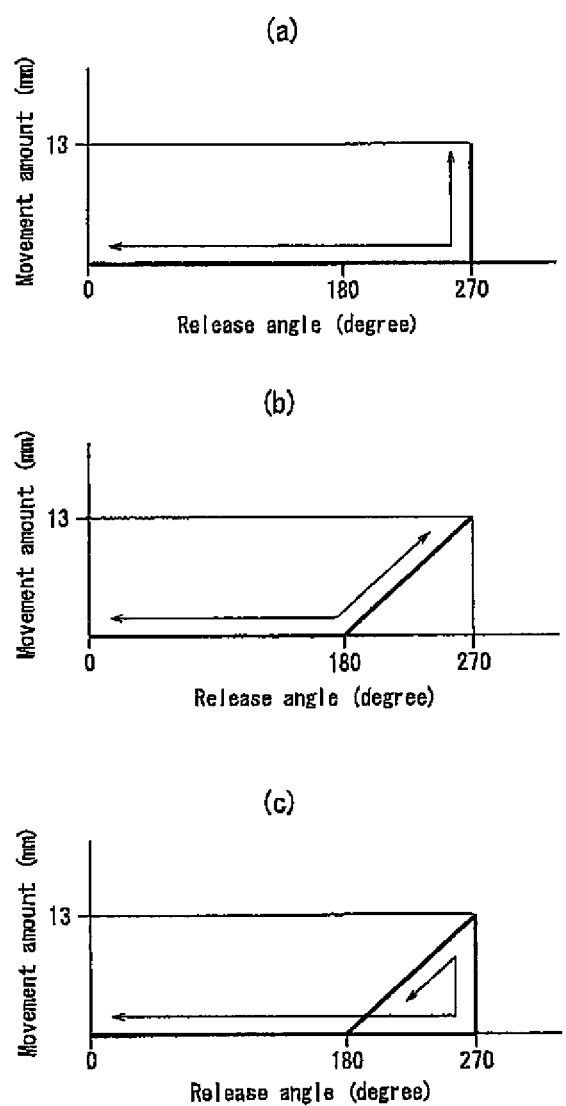
FIG. 10 shows simplified movements of the first housing by means of the hinge portion according to the present invention, in which (a) is an explanatory view showing a movement trajectory in the first embodiment as a graph, (b) is an explanatory view showing a movement trajectory in the second embodiment as a graph, and (c) is an explanatory view showing another movement trajectory as a graph.

At a position generally corresponding to an end portion of the second-housing-side pin receiving portion 18b side of the protrusion 19 (refer to FIG. 3 (b)), the projection 45 is formed so as to have a shape and a size capable of being inserted and locked in the cam groove 43 to guide and move the groove 43 (refer to FIG. 9 (b)). FIG. 10 shows the simplified movement of the first housing by means of the hinge portion according to the present invention, in which (a) is an explanatory view showing a movement trajectory in the first embodiment as a graph; (b) is an explanatory view showing a movement trajectory in the second embodiment as a graph; and (c) is an explanatory view showing another movement trajectory as a graph. In these figures, the longitudinal axis shows the amount of the movement (mm) of the first housing, and the lateral axis shows the release angle (degree) of the housing.

As shown in FIG. 10 (a), the first housing 11a in the first embodiment is in the housing-released state without moving in the direction C while the housing 11a has the release angle within the range of 0 to 270 degrees, and after the release angle exceeds 270 degrees, the housing 11a moves in the direction C. As shown in FIG. 10 (b), the first housing 42a in the second embodiment is in the housing-released state without moving in the direction C while having the release angle within the range of 0 to 180 degrees, and when having the release angle from 180 to 270 degrees, the housing 11a gradually moves in the direction C continuously in accordance with an increase in the release angle. In this way, the first housing 11a in the first embodiment and the first housing 42a in the second embodiment follow the same trajectory when the housings are released and when the housings are retracted. However, as shown in FIG. 10 (c), the housings 11a, 42a may follow the different trajectories when the housing is released and when retracted, such as the trajectory shown in FIG. 9 (a) when released and that shown in FIG. 10 (b) when stored.

Figure 11:
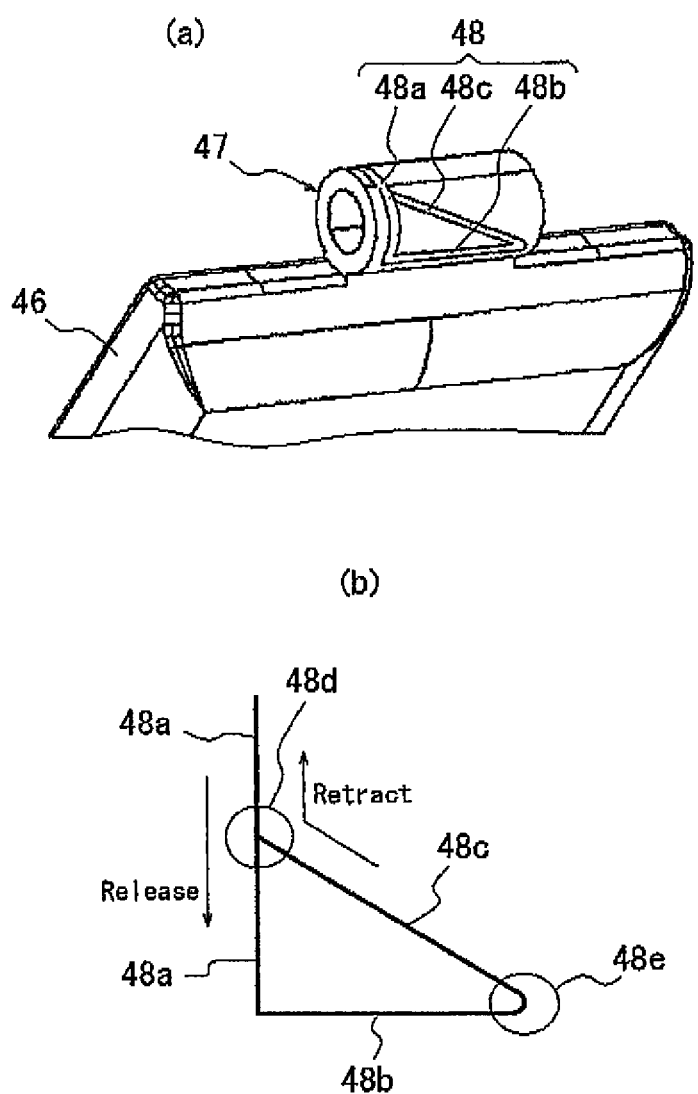
FIG. 11 shows a constitutional example of a cam giving the movement trajectory shown in FIG. 10(c), in which (a) is an explanatory view of a cam groove formed on a first housing and (b) is a developed explanatory view of the cam groove shown in FIG. 11(a).

FIG. 11 shows a constitutional example of a cam giving the movement trajectory shown in FIG. 10 (c), in which (a) is an explanatory view of a cam groove formed on a first housing and (b) is a developed explanatory view of the cam groove shown in FIG. 11 (a). As shown in FIG. 11 (a), a cam groove 48 formed on a first-housing-side pin receiving portion 47 of a first housing 46 consists of a first cam groove 48a disposed generally in parallel to the pivot direction A (refer to FIG. 8) of the first housing 46 to a base of the portion 47, a second cam groove 48b continuing to an end portion of the groove 48a and disposed generally perpendicular to the pivot direction A as well as along the axial direction of the portion 47, and a third cam groove 48c continuing to an end portion of the groove 48b and disposed obliquely relative to the pivot direction A.

In other words, the cam groove 48 is formed by extending the first cam groove 43a of the cam groove 43 to form the first cam groove 48a generally parallel to the pivot direction A, and, by means of the second cam groove 48b which is generally parallel to the direction C and generally perpendicular to the first cam groove 48a continuing from an extended end portion of the groove 48a, coupling the third having the same constitution as that of the second cam groove 43b. With defining a point where the first cam groove 48a and the third cam groove 48c merge with each other as a merging point 48d, as well as with a point where the second cam groove 48b and the third cam groove 48c continue to each other as a bending point 48e, the groove 48 is formed such that the groove 48a near the point 48d has depth deeper than that of the 48c (namely, groove depth of the groove 48a is greater than that of the groove 48c). At the same time, the projection 45 (refer to FIG. 9 (b)) to be inserted and locked in the cam groove 48 is urged in a projecting direction using the urging means (not shown).

This makes it possible for the projection 45 to move along the cam groove 48 in the order of 48a, 48d, 48a, 48b, and 48e when the housing is released, and to move along the cam groove 48 in the order of 48e, 48c, 48d, and 48a when the housing is retracted, thereby allowing smooth release and retract operation. In short, providing the third cam groove 48c enables the first housing 46 to simultaneously conduct a closing operation and a pull-in operation, both being combination of the pivot operation about the axis with the lateral movement along the axial direction at the hinge 12, thereby gradually compensate the lateral displacement of the housing to its original position. Thus, when the release angle transfers from the housing-released state with the release angle is 270 degrees to the housing-stored state with the release angle is 0 degree, the first housing 11a gradually returns from the state where it is laterally displaced relative to the second housing 11b to the state where it lays on the second housing 11b along with the pivot operation.

In this way, the mobile phone according to the present invention in the housing-released state can be maintained in the self-standing state with the displaying unit being inclined at the predetermined inclination angle while facing upwardly by being placed on the placement location such as the desk in a lay-down state where both of the housings are laid down.

Figure 12:
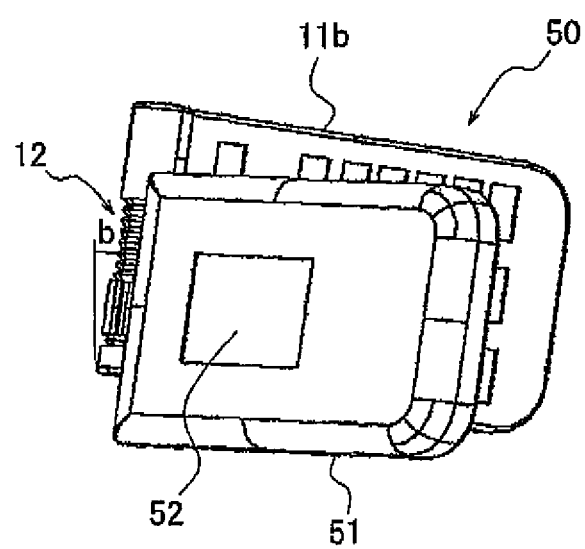
FIG. 12 is a perspective view of the mobile phone in the self-standing state showing another installation example of the displaying unit.

It is noted that the above-mentioned mobile phone includes merely one displaying unit 13 provided on one surface of the first housing, however, it may have two displaying units provided on both surfaces of the first housing. FIG. 12 is a perspective view of the mobile phone in the self-standing state showing another installation example of the displaying unit. As shown in FIG. 12, a mobile phone 50 includes, in addition to the displaying unit 13 provided on the surface that is an appearance surface of the first housing 51 (refer to FIG. 1 (a)), a displaying unit 52 provided on a rear surface (back surface) that is an opposite-side surface relative to the displaying unit 13. In this case, the mobile phone 50 is maintained in the self-standing state where the displaying unit 52 is upwardly inclined at the inclination angle b of approximately 10 degrees when the mobile phone is in the housing-released state where the release angle α is approximately 90 degrees prior to be in the housing-released state where the release angle α is approximately 270 degrees.

The controlling unit 35 executes processing in conjunction with application software such that in the mobile phone provided with TV phone function for example, when a call is initiated in a self-standing state or alternatively the self-standing state is achieved during calling, the mobile phone is switched into a TV phone mode. Additionally, in a case where the mobile phone is provided with microphones on the respective upper and lower housings, the mobile phone is adopted to activate the microphone on the upper housing (on the same surface of the displaying unit) into the self-standing state. Further, in a case where the mobile phone is provided with two cameras directed inwardly and outwardly, the mobile phone is adopted to activate the camera on the displaying unit side (e.g., the camera inwardly directed) that will be the main camera, when the camera is activated in the self-standing state. Furthermore, the mobile phone may be provided with the locking mechanism for maintaining the first and the second housings at a predetermined release angle on at least one location having the release angle defined by the first and the second housings other than the release angle during calling (generally 180 degrees). This locking mechanism can be formed by, for example, a locking projection and a positioning groove in which the locking projection inserts to be locked at a predetermined release angle.

As mentioned above, a mobile phone according to the present invention comprises a first housing provided with a displaying unit; a second housing on which the first housing is laid; a hinge portion pivotably connecting respective one end portions of the first and second housings with each other such that the first housing moves toward/away from the second housing; and a self-stand maintaining unit for maintaining a self-standing state where the displaying unit is inclined by pivoting the first housing relative to the second housing with the hinge as a pivoting center, as well as moving the first housing along an axial direction of the hinge to bring a side of the first housing and a contact portion on a side surface of the second housing into contact with a placement surface.

The first housing is allowed to move along the axial direction of the hinge portion with the first housing pivoted at a predetermined angle relative to the second housing, and after the first housing moves to the axial direction of the hinge portion, the self-stand maintaining unit brings the side of the first housing and the contact portion on the side surface of the second housing into contact with the placement surface to maintain the self-standing state where the displaying unit is inclined. In addition, the hinge portion comprises a first-housing-side receiving portion formed on the first housing, a second-housing-side receiving portion formed on the second housing, and a rotary shaft portion to be attached to the first-housing-side receiving portion and the second-housing-side receiving portion, and further comprises a key groove formed on the first-housing-side receiving portion and the second-housing-side receiving portion, which the key groove guides the hinge portion in the axial direction, and a protrusion to be slidably attached to the key groove.

The first housing continuously moves along the axial direction of the hinge portion in accordance with pivoting relative to the second housing, and after the first housing pivots at the predetermined angle relative to the second housing, the self-stand maintaining unit brings the side of the first housing and the contact portion on the side surface of the second housing into contact with the placement surface to maintain the self-standing state where the displaying unit is inclined. Additionally, the hinge portion comprises a first-housing-side receiving portion formed on the first housing, a second-housing-side receiving portion formed on the second housing, and a rotary shaft portion to be attached to the first-housing-side receiving portion as well as the second-housing-side receiving portion, and further comprises a projection formed on the second housing and a cam groove made up of a first cam groove formed on the first-housing-side receiving portion for locking the projection to guide the first housing along a pivot direction, and a second cam groove continuing to the first cam groove to guide the first housing along the axial direction of the hinge portion.

The cam groove is made up of a first cam groove formed on the first-housing-side receiving portion to lock the projection to guide the first housing along the pivot direction, and a second cam groove continuing to the first cam groove to guide the first housing along the axial direction of the hinge portion, and a third cam groove continuing to the second cam groove to guide a movement in combination of the movement along the pivot direction of the first housing and the movement along the axial direction of the hinge portion. Additionally, the mobile phone comprises a controlling unit for conducting a control for widening a view angle of the displaying unit when the projection is locked. Further, the mobile phone is provided with a TV broadcast receiving function, and comprises a controlling unit for automatically activating the TV broadcast receiving function when the projection is locked. Furthermore, the mobile phone is provided with a TV phone function, and comprises a controlling unit for switching the mobile phone into a TV phone when a call is initiated in the locking state or alternatively the locking-standing state is achieved during calling.

The mobile phone comprises a first housing provided with a displaying unit; a second housing on which the first housing is laid; a hinge portion pivotably connecting respective one end portions of the first and second housings with each other such that the first housing moves toward/away from the second housing; and a self-stand maintaining unit for maintaining a self-standing state where the displaying unit is inclined by placing on a placement surface a side intersecting (generally perpendicular to) a side surface connected to the hinge portion of the first housing and a portion of a side of the second housing which is positioned on the same surface of the side in the closed state where the first and the second housings are laid one on the other.

The above-described constitution enables to realize, with an uniaxial hinge, the mobile terminal device having the structure capable of self-standing on the placement surface in a state where the display unit is arranged in a landscape position and in an upwardly inclined state, so that a user easily watches the displaying unit, and her, easily views the TV broadcast and the like. Further, the mobile terminal device can self-stands only by itself in the upwardly inclined state, so that it is not required to provide a separate mechanism or component for self-standing and inclining the device, such as a charging stand or a stand. Furthermore, appropriate application software is activated depending on the pivot motion or the pivot direction and various functions cooperate with each other, which reveals user-friendliness.

In this way, in the mobile terminal device according to the present invention, the first housing provided with the displaying unit is laid on the second housing, the hinge portion pivotably connecting respective one end portions of the first and second housings with each other such that the first housing moves toward/away from the second housing, and the first housing moves along the axial direction of the hinge portion when pivoted with the hinge portion being as the center of pivoting to bring a side of the first housing and a contact portion on a side surface of the second housing into contact with a placement surface to maintaining the self-standing state where the displaying unit is inclined. Thus, the mobile terminal device can maintain the self-standing state where the displaying surface is inclined only by itself without using a dedicated member for securing the self-standing posture.

The present application claims the benefits of priority from Japanese Patent Application No. 2006-050287 (filed on Feb. 27, 2006), which is hereby incorporated by reference in its entirety.

The invention claimed is:

1. A mobile terminal device comprising:
a first housing provided with a displaying unit;
a second housing on which the first housing is laid;
a hinge portion pivotably connecting respective one end portions of the first and second housings with each other such that the first housing moves toward/away from the second housing; and
a self-stand maintaining unit for maintaining a self-standing state where the displaying unit is inclined by pivoting the first housing relative to the second housing with the hinge as a pivoting center, as well as moving the first housing and the displaying unit along an axial direction of the hinge portion to bring a side intersecting the one end portion connected to the hinge portion of the first housing into contact with a placement surface, a contact portion on one end of a side surface intersecting the one end portion connected to the hinge portion of the second housing into contact with the placement surface, and the other end at the hinge portion side of the side surface of the second housing not into contact with the placement surface, wherein
the hinge portion comprises a first-housing-side receiving portion formed on the first housing, a second-housing-side receiving portion formed on the second housing, and a rotary shaft portion to be attached to the first-housing-side receiving portion and the second-housing-side receiving portion, and
the device further comprises a key groove formed on the first-housing-side receiving portion and the second-housing-side receiving portion, which the key groove guides the hinge portion in the axial direction, and a protrusion to be slidably attached to the key groove.

2. The mobile terminal device according to claim 1, wherein the first housing is allowed to move along the axial direction of the hinge portion with the first housing pivoted at a predetermined angle relative to the second housing, and after the first housing moves to the axial direction of the hinge portion, the self-stand maintaining unit brings the side of the first housing and the contact portion on the side surface of the second housing into contact with the placement surface to maintain the self-standing state where the displaying unit is inclined.

3. The mobile terminal device according to claim 2, wherein
the hinge portion comprises a first-housing-side receiving portion formed on the first housing, a second-housing-side receiving portion formed on the second housing, and a rotary shaft portion to be attached to the first-housing-side receiving portion as well as the second-housing-side receiving portion, and
the device further comprises a projection formed on the second housing and a cam groove made up of a first cam groove formed on the first-housing-side receiving portion for locking the projection to guide the first housing along a pivot direction, and a second cam groove continuing to the first cam groove to guide the first housing along the axial direction of the hinge portion.

4. The mobile terminal device according to claim 1, wherein the first housing continuously moves along the axial direction of the hinge portion in accordance with pivoting relative to the second housing, and after the first housing pivots at the predetermined angle relative to the second housing, the self-stand maintaining unit brings the side of the first housing and the contact portion on the side surface of the second housing into contact with the placement surface to maintain the self-standing state where the displaying unit is inclined.

5. The mobile terminal device according to claim 1, further comprising a controlling unit for conducting a control for widening a view angle of the displaying unit when the projection is locked.

6. The mobile terminal device according to claim 1, further comprising a TV broadcast receiving function and a controlling unit for automatically activating the TV broadcast receiving function when the projection is locked.

7. The mobile terminal device according to claim 1, further comprising a TV phone function and a controlling unit for switching the mobile phone into a TV phone when a call is initiated in the locking state or alternatively the locking-standing state is achieved during calling.

8. A mobile terminal device comprising:
a first housing provided with a displaying unit;
a second housing on which the first housing is laid;
a hinge portion pivotably connecting respective one end portions of the first and second housings with each other such that the first housing moves toward/away from the second housing; and
a self-stand maintaining unit for maintaining a self-standing state where the displaying unit is inclined by pivoting the first housing relative to the second housing with the hinge as a pivoting center, as well as moving the first housing along an axial direction of the hinge portion to bring a side of the first housing and a contact portion on a side surface of the second housing into contact with a placement surface,
wherein the first housing is allowed to move along the axial direction of the hinge portion with the first housing pivoted at a predetermined angle relative to the second housing, and after the first housing moves to the axial direction of the hinge portion, the self-stand maintaining unit brings the side of the first housing and the contact portion on the side surface of the second housing into contact with the placement surface to maintain the self-standing state where the displaying unit is inclined,
wherein the hinge portion comprises a first-housing-side receiving portion formed on the first housing, a second-housing-side receiving portion formed on the second housing, and a rotary shaft portion to be attached to the first-housing-side receiving portion as well as the second-housing-side receiving portion, and
the device further comprises a projection formed on the second housing and a cam groove made up of a first cam groove formed on the first-housing-side receiving portion for locking the projection to guide the first housing along a pivot direction, and a second cam groove continuing to the first cam groove to guide the first housing along the axial direction of the hinge portion,
wherein the cam groove is made up of a first cam groove formed on the first-housing-side receiving portion to lock the projection to guide the first housing along the pivot direction, and a second cam groove continuing to the first cam groove to guide the first housing along the axial direction of the hinge portion, and a third cam groove continuing to the second cam groove to guide a movement in combination of the movement along the pivot direction of the first housing and the movement along the axial direction of the hinge portion.

9. A mobile terminal device comprising:
a first housing provided with a displaying unit;
a second housing on which the first housing is laid;
a hinge portion pivotably connecting respective one end portions of the first and second housings with each other such that the first housing moves toward/away from the second housing; and
a self-stand maintaining unit for maintaining a self-standing state where the displaying unit is inclined by placing on a placement surface a side intersecting a side surface connected to the hinge portion of the first housing and a portion on one end of a side of the second housing which is positioned on the same surface of the side of the first housing in the closed state where the first and the second housings are laid one on the other, wherein the displaying unit is inclined with respect to the second housing when the first housing is laid above the second housing, and the other end at the hinge portion side of the side of the second housing does not contact with the placement surface, wherein
the hinge portion comprises a first-housing-side receiving portion formed on the first housing, a second-housing-side receiving portion formed on the second housing, and a rotary shaft portion to be attached to the first-housing-side receiving portion and the second-housing-side receiving portion, and
the device further comprises a key groove formed on the first-housing-side receiving portion and the second-housing-side receiving portion, which the key groove guides the hinge portion in the axial direction, and a protrusion to be slidably attached to the key groove.

* * * * *